United States Patent [19]
Murschall et al.

[11] Patent Number: 5,900,310
[45] Date of Patent: * May 4, 1999

[54] HEAT-SEALABLE, ORIENTED, MULTILAYER POLYOLEFIN FILM

[75] Inventors: Ursula Murschall, Nierstein; Herbert Peiffer, Mainz; Gunter Schloegl, Kelkheim, all of Germany

[73] Assignee: Hoechst Aktiengesellschaft, Frankfurt am Main, Germany

[ * ] Notice: This patent is subject to a terminal disclaimer.

[21] Appl. No.: 08/638,318

[22] Filed: Apr. 26, 1996

Related U.S. Application Data

[63] Continuation of application No. 08/208,717, Mar. 11, 1994, abandoned.

[30] Foreign Application Priority Data

Mar. 19, 1993 [DE] Germany ............................. 43 08 854

[51] Int. Cl.$^6$ .............................. B32B 7/10; B32B 27/08; B32B 27/32
[52] U.S. Cl. ...................... 428/214; 428/35.7; 428/215; 428/216; 428/323; 428/328; 428/330; 428/331; 428/336; 428/339; 428/349; 428/355 EN; 428/403; 428/404; 428/447; 428/515; 428/516; 428/523; 206/524.1
[58] Field of Search .................... 428/35.7, 323, 428/331, 328, 329, 330, 343, 346, 347, 349, 515, 516, 523, 910, 403, 404; 526/348.1, 348.6; 524/492, 493, 442, 444, 445, 447, 448, 450; 525/240, 191

[56] References Cited

U.S. PATENT DOCUMENTS

| | | |
|---|---|---|
| 3,803,065 | 4/1974 | Arai et al. ............................. 260/23 H |
| 4,375,494 | 3/1983 | Stokes ...................................... 428/323 |
| 4,419,411 | 12/1983 | Park ......................................... 428/516 |
| 4,590,125 | 5/1986 | Balloni et al. .......................... 428/349 |
| 4,622,237 | 11/1986 | Lori ............................................ 427/40 |
| 4,692,379 | 9/1987 | Keung et al. ............................ 428/349 |
| 4,711,673 | 12/1987 | Musselman et al. ............... 106/287.17 |
| 4,734,317 | 3/1988 | Bothe et al. ............................. 428/215 |
| 4,764,425 | 8/1988 | Balloni et al. .......................... 428/331 |
| 4,818,581 | 4/1989 | Katoh et al. ............................ 428/143 |
| 4,911,976 | 3/1990 | Park et al. ............................... 428/216 |
| 4,956,232 | 9/1990 | Balloni et al. .......................... 428/349 |
| 5,164,439 | 11/1992 | Sakamoto et al. ...................... 524/425 |
| 5,508,090 | 4/1996 | Peiffer et al. ........................... 428/214 |
| 5,681,650 | 10/1997 | Peiffer et al. ........................... 428/212 |

FOREIGN PATENT DOCUMENTS 0 468 333  1/1992  European Pat. Off. .

OTHER PUBLICATIONS

Derwent Publications, Ltd., AN 81–80575D and JP–A–56 118 444 published Sep. 17, 1981.

Primary Examiner—Paul J. Thibodeau
Assistant Examiner—Vivian Chen
Attorney, Agent, or Firm—Foley & Lardner

[57] ABSTRACT

An oriented, heat-sealable, multilayer polyolefin film comprising a base layer containing polypropylene and a heat-sealable outer layer on each side of the base layer. The heat-sealable outer layers contain a propylene copolymer and/or a propylene terpolymer and a mixture of an antiblocking agent having a mean particle diameter of from about 3 to 5 $\mu$m and a further antiblocking agent having a mean particle diameter of from about 1 to 2.5 $\mu$m.

19 Claims, No Drawings

HEAT-SEALABLE, ORIENTED, MULTILAYER POLYOLEFIN FILM

This application is a Continuation of application Ser. No. 08/208,717, filed Mar. 11, 1994, abandoned.

BACKGROUND OF THE INVENTION

1. Field of the Invention

The invention relates to an oriented, heat-sealable, multilayer polyolefin film comprising a base layer essentially containing polypropylene, and at least one heat-sealable outer layer. The films are distinguished by excellent heat-sealing properties and excellent running properties on high-speed packaging machines.

2. Description of Related Art

The demands made of the processing properties of films and their smooth passage through automatic machines have increased continually over the years. Modern automatic packaging machines, as used, for example, in the cigarette industry, operate at a rate of 350 to 450 wrappers per minute. Films which run on such machines require properties which are carefully balanced with respect to each other. The problem that frequently-occurs is that optimization of one property unacceptably impairs another property.

Films which have good running properties due to a balanced synergistic formulation are known. EP-A-0,182,463 describes a multilayer heat-sealable film containing from 0.05 to 0.2% by weight of tertiary aliphatic amine in the base layer and a combination of silicone oil and $SiO_2$ in the heat-sealable outer layer. According to the description, the surprising interaction of $SiO_2$, silicone oil and amine in combination with a selected outer layer thickness of less than 0.8 $\mu$m gives films having a coefficient of friction of 0.3 or less. This film has the disadvantage that the outer layer thickness cannot exceed 0.8 $\mu$mg without greatly impairing the running properties.

EP-A-0,143,130 discloses multilayer heat-sealable films containing a carboxamide in the base layer and likewise the combination of silicone oil and $SiO_2$ in the outer layer. As in EP-A-0,182,463 mentioned above a synergistic effect of the three selected components on the coefficient of friction is described. These films have deficient blocking behavior at elevated temperature in spite of their advantageous surface slip (low coefficient of friction).

EP-A-0,194,588 and EP-A-0,217,598 describe similar films in which silicone oil, if desired in combination with $SiO_2$, is incorporated only into one outer layer. The second, silicone oil-free outer layer is corona-treated to improve the printability. The transfer of silicone oil onto the surface of this treated second outer layer subsequently takes place by contact with the first, silicone oil-containing outer layer. This feature gives a silicone oil-treated film having good surface-slip characteristics which is simultaneously readily printable on the corona-treated side, but is nevertheless heat-sealable.

The films of the prior art are all unsatisfactory with respect to their running properties, their blocking values at elevated temperature and their heat-sealing properties. There is a general need in the packaging industry to keep the costs for packaging as low as possible. For this reason, it is always attempted to allow the machines to run at maximum speed, since this is associated with greater economic efficiency. An important limiting factor for the maximum speed is the film's properties.

SUMMARY OF THE INVENTION

The present invention thus has the object of providing heat-sealable films which run rapidly and in a trouble-free and energy-saving manner on automatic packaging machines, and at the same time with no impairment of the quality of the packaging.

Another object of the present invention is to provide a heat-sealable film, in particular a multilayer polyolefin film which provides among other things good blocking properties at elevated temperatures and good heat-sealing properties.

Another object of the invention is to provide a heat-sealable film, in particular a multilayer polyolefin film which provides a low heat-sealing temperature. Preferably this heat-sealing temperature is in the range of about 105 to 115° C.

It is still another object of the present invention to provide a process for the production of the heat-sealable multilayer polyolefin film by a coextrusion process Yet another object of the present invention is to provide a packaged article which is surrounded by the heat-sealable film.

Still another object of the present invention is to provide an antiblocking agent which is added to a heat-sealable film, preferably the outer layers of a multilayer polyolefin film and provides superior blocking properties at elevated temperatures In accomplishing the foregoing objects, there has been provided according to one aspect of the present invention an oriented heat-sealable, multilayer polyolefin film, comprising a base layer containing polypropylene and at least one heat-sealable outer layer, wherein the heat-sealable outer layer comprises a polypropylene copolymer and/or a polypropylene terpolymer and a mixture of a first antiblocking agent having a mean particle diameter from about 3 to 5 $\mu$m and a second antiblocking agent having a mean particle diameter from about 1 to 2.5 $\mu$m. In a preferred embodiment, the first antiblocking agent has been subject to an organic aftertreatment coating, preferably a carboxylic acid containing coating such as citric acid. In another preferred embodiment, the first and second antiblocking agent are both $SiO_2$, and each is present in the outer layer in an amount of about 0.05 to 0.4% by weight of the outer layer.

In a preferred embodiment the outer layer of the heat-sealable film is a mixture of the polypropylene copolymer and the polypropylene terpolymer. The copolymer is preferably an ethylene-propylene copolymer and the terpolymer is an ethylene-propylene-butylene terpolymer. Preferably the outer layer has a content of copolymer in the range from about 20 to 80% by weights preferably from about 30 to 60% by weight, in particular from about 45 to 55% by weight, and a content of terpolymer in the range from about 80 to 20% by weight, preferably from about 40 to 70% by weight, in particular from about 45 to 55% by weight, based on the total weight of the mixture. More preferably, the mixture has a total ethylene content of about 2 to 5% by weight, a butylene content of about 2 to 8% by weight and a propylene content of about 85 to 96% by weight, based on the total weight of the mixture Preferably, the outer layer contains silicone oil such as polydimethylsiloxane in an amount of about 0.5 to 3.0% by weight.

The present invention also provides a process for the production of the multilayer polyolefin film comprising the step of coextruding melts corresponding to the individual layers of the film through a flat-film die, taking the coextruded film off over a take-off roll whose temperature is from about 80 to 110° C., biaxially stretching the film at a longitudinal stretching ratio of about 4:1 to 7:1 and a transverse stretching ratio of about 8:1 to 11:1, heat-setting the biaxially stretched film, and optionally corona-treating the heat-set film and subsequently winding up the film, and wherein the film has a coefficient of friction after about 10 days of from 0.2 to 0.35. In a preferred embodiment, the first and second antiblocking agents are incorporated into the outer layer of the multilayer film.

The present invention also provides a packaged article comprising the multilayer polyolefin film surrounding at least in part an article.

The present invention further provides an antiblocking agent mixture which comprises a first antiblocking agent having a mean particles diameter of about 3 to 5 µm and a second antiblocking agent having a mean particle diameter of about 1 to 2.5 µm. Preferably the mixture is used in the heat sealable outer layer of a multilayer polyolefin film.

DETAILED DESCRIPTION OF THE PREFERRED EMBODIMENTS

The present invention comprises a film of the generic type mentioned at the outset, wherein the heat-sealable outer layer contains a polypropylene copolymer and/or a polypropylene terpolymer and a mixture of a first antiblocking agent having a mean particle diameter of from about 3 to 5 µm and a second antiblocking agent having a mean particle diameter of from about 1 to 2.5 µm.

The base layer of the multilayer film according to the invention essentially comprises a polypropylene polymer and, if desired, added additives, in effective amounts in each case. The polypropylene polymer contains predominantly (at least about 90%) propylene and has a melting point of 140° or above, preferably from about 150 to 170° C. Isotactic homopolypropylene having an n-heptane-soluble content of about 6% by weight or less, based on the isotactic homopolypropylene, copolymers of ethylene and propylene having an ethylene content of about 5% by weight or less, and copolymers of propylene with $C_4$–$C_8$ α-olefins having an α-olefin content of about 5% by weight or less are preferred polypropylene polymers for the base layer, particular preference being given to isotactic polypropylene. The polypropylene polymer of the base layer generally has a melt flow index of from about 0.5 g/10 min to about 10 g/10 min, preferably from about 1.5 g/10 min to about 4 g/10 min, at about 230° C. and a force of about 21.6 N (DIN 53 735). These percentages by weight relate to the respective copolymer.

The polypropylene polymer employed in the base layer may be partially degraded by addition of organic peroxides. A measure of the degree of degradation of the polymer is degradation factor A, which gives the relative change in the melt flow index, measured in accordance with DIN 53 735, of the polypropylene, based on the starting polymer.

$$A = \frac{MFI_2}{MFI_1}$$

$MFI_1$=melt flow index of the polypropylene polymer before addition of the organic peroxide.

$MFI_2$=melt flow index of the polypropylene polymer degraded by peroxide.

In general, the degradation factor A of the polypropylene polymer employed for the base layer is in the range from about 3 to 15, preferably from about 6 to 10.

Particularly preferred organic peroxides are dialkyl peroxide, where the term alkyl radical is defined as a conventional saturated, straight-chain or branched lower alkyl radical having up to six carbon atoms. Particular preference is given to 2,5-dimethyl-2,5-di(t-butylperoxide)-hexane and di-t-butyl peroxide.

The multilayer film is provided according to the invention with at least one outer layer containing a heat-sealable polypropylene copolymer and/or polypropylene terpolymer and a mixture of antiblocking agents.

For the purposes of the present invention, particularly suitable propylene copolymers for the outer layer are ethylene ($C_2$)/propylene ($C_3$) copolymers, especially random ethylene-propylene copolymers. The ethylene content of the copolymers is generally in the range from about 3 to 7% by weight, preferably in the range from about 3.5 to 5% by weight. Copolymers having a melt flow index (measured in accordance with DIN 53 735 at about 230° C., and a load of about 2.16N) in the range from about 1 to 15 g/10 min, preferably from about 5 to 10 g/10 min and a melting point in the range from about 130 to 145° C., preferably from about 135 to 140° C. as measured by a differential scanning calorimeter (DSC).

Particularly suitable propylene terpolymers are ethylene ($C_2$)/propylene ($C_3$)/butylene ($C_4$) -terpolymers. The $C_2/C_3/C_4$-terpolymers generally have an ethylene content of from about 2 to 5% by weight, preferably from about 3.5 to 4.5% by weight, a butylene content of from about 5 to 10% by weight, preferably from about 6 to 8% by weight, and a corresponding propylene content of from about 85 to 93% by weight. The melt flow index of the terpolymer is generally in the range from about 1 to 15 g/10 min, preferably in the range from about 5 to 10 g/10 min. The melting point (DSC) is in the range from about 130 to 140° C. and is preferably about 135° C. All weight percentage data regarding the copolymers and terpolymers described above relate to the particular copolymer or terpolymer being described.

It has been found that embodiments of the invention having a minimum heat-sealing temperature in the range of about 105 to 115° C. are particularly advantageous. Surprisingly, such a low heat-sealing temperature can be achieved within this narrow range of from about 105 to 115° C. by means of a mixture of the above-described copolymers and terpolymers. The content of copolymers and terpolymers in the mixture can vary within broad limits. However, the low heat-sealing composition is advantageously selected so that the $C_2$ content of the mixture is in the range from about 2 to 5% by weight and preferably from about 3 to 4% by weight, the $C_3$ content of the mixture is in the range from about 85 to 96% by weight, preferably from about 88 to 94% by weight, and the $C_4$ content of the mixture in the range from about 2 to 8% by weight, preferably from about 4 to 6% by weight. The copolymer content of the mixture is generally from about 20 to 80% by weight, preferably from about 30 to 60% by weight, in particular from about 45 to 55% by weight. The terpolymer content of the mixture is normally from about 20 to 80% by weight and preferably from about 40 to 70% by weight, in particular from about 45 to 55% by weight. All weight percentage data relating to the above-described mixture of copolymer and terpolymer relate to the mixture being described.

For the purpose of the present invention, a mixture is taken to mean either a mechanical mixture or a blend of the individual components, mechanical mixtures having proven advantageous and being preferred. Mechanical mixtures open up significantly more opportunities in film production to optimize the composition of the outer layer. A blend is generally obtained from the film manufacturer as a raw material having a defined composition which cannot easily be changed even by the film manufacturer.

The above-described outer layer polymers can also be degraded by a peroxide in an analogous manner to that described above for the base layer. In principle, the same peroxides as described above are used for the degradation. The degradation factor A of the outer layer polymers is generally in the range from about 3 to 15, preferably from about 6 to 10.

It is essential to the present invention that the polymer or polymer mixture of the outer layer contains a combination of two antiblocking agents which are different with respect to their size. Suitable antiblocking agents are conventionally used substances such as $SiO_2$, silicates, diatomaceous earth, chalk, $CaCO_3$, $TiO_2$, etc $SiO_2$ has proven particularly advantageous $SiO_2$ is generally prepared by grinding silica gel and is a synthetic, highly porous, pure silicic acid which has an entirely amorphous structure, in contrast to crystalline silicic acids. The $SiO_2$ content is generally above about 95%, in particular in the range from about 98 to 99.5%.

The first, coarse antiblocking agent has a mean particle diameter from about 3 to 5 $\mu$m, preferably from about 3.5 to 4.5 $\mu$m, particular preference being given to $SiO_2$ having this particle size.

In a particularly advantageous embodiment, the $SiO_2$ particles having a mean particle diameter from about 3 to 5 $\mu$m have been subjected to an organic aftertreatment coating and have a coating containing from about 0.5 to 5% of an aliphatic carboxylic acid. Preferred aliphatic carboxylic acids are aliphatic hydroxydi- and tri-carboxylic acids or stearic acid. In general, the acids have from two to five, preferably from two to three, hydroxyl groups. Preferred aliphatic carboxylic acids are tartronic acid (hydroxymalonic acid), malic acid (monohydroxysuccinic acid), tartaric acid (dihydroxysuccinic acid) and citric acid. Coatings containing citric acid have proven particularly advantageous. As a consequence of the organic coating, the coarse $SiO_2$ particles are slightly acidic in aqueous solutions. The pH of about a 5% strength aqueous suspension is in the range from about 3 to 5, preferably about 4.

The content of the first coarse antiblocking agent, in particular $SiO_2$, is in the range from about 0.05 to 0.4% by weight, preferably from about 0.1 to 0.25% by weight, based on the outer layer.

The second, fine antiblocking agent has a mean particle diameter from about 1 to 2.5 $\mu$m, preferably about 2 $\mu$m. The preferred fine antiblocking agent is likewise $SiO_2$, this generally being employed without an organic aftertreatment coating. The content of the second fine antiblocking agent in the outer layer is from about 0.05 to 0.4% by weight, preferably from about 0.1 to 0.25% by weight, based on the outer layer.

In a preferred embodiment, the outer layer additionally contains silicone oil, generally in an amount from about 0.5 to 3% by weights based on the outer layer. The viscosity of the silicone oil is generally from about 20,000 to 3,000,000 $mm^2/s$, preferably from about 20,000 to 1,000,000 $mm^2/s$. Preferred silicone oils are polydialkyl siloxanes, in particular those containing alkyl radicals having 1 to 6 carbon atoms. Polydimethylsiloxane is particularly advantageous, in particular in an amount of about 0.5 to 3% by weight, based on the outer layer, and having a viscosity from about 20,000 to 1,000,000 $mm^2/s$.

The multilayer film according to the present invention comprises at least the above-described base layer and at least one outer layer containing the above-described polymers or mixtures thereof and the antiblocking agent mixture according to the present inventions. Depending on its intended applications the multilayer film can have a further outer layer on the opposite side. In a preferred embodiment, the multilayer film has three layers, wherein the outer layers applied may be identical or different. Preferably the outer layer films have an identical composition.

The thickness of the outer layer(s) is greater than about 0.4 $\mu$m and is preferably in the range from about 0.4 to 3 $\mu$m, in particular from about: 0.4 to 2 $\mu$m, wherein the outer layers on both sides may have identical or different thicknesses.

The overall thickness of the multilayer polyolefin film according to the invention can vary within broad limits and depends on the intended application. It is preferably from about 5 to 70 $\mu$m, in particular from about 10 to 50 $\mu$m, the base layer making up from about 50 to 90% of the overall film thickness.

In another embodiment in addition to the selected additives for the outer layer(s)e the multilayer film according to the invention may additionally contain neutralizers, antistatics and stabilizers.

The stabilizers optionally employed can be conventional stabilizing compounds for ethylene, propylene and other α-olefin polymers. The amount of stabilizers added is from about 0.05 to 2% by weight. Phenolic stabilizers, alkali/alkaline earth metal stearates and/or alkali/alkaline earth metal carbonates are particularly suitable.

Phenolic stabilizers are preferred in an amount from about 0.1 to 0.6% by weight, in particular from about 0.15 to 0.3% by weight, and with a molecular weight greater than about 500 g/mol. Pentaerythritol tetrakis[3-(3,5-di-tert-butyl-4-hydroxyphenyl)propionate] and 1,3,5-trimethyl-2,4,6-tris(3, 5-di-tert-butyl-4-hydroxybenzyl)benzene are particularly advantageous.

The neutralizers optionally employed are preferably calcium stearate, dihydrotalcite and/or calcium carbonate having a mean particle size of at most about 0.7 $\mu$m, an absolute particle size of less than about 10 $\mu$m and a specific surface area of at least about 40 $m^2/g$.

The antistatics optionally employed are preferably alkali metal alkanesulfonates, polyether-modified, i.e., ethoxylated and/or propoxylated polydiorganosiloxanes (polydialkylsiloxanese polyalkylphenylsiloxanes and the like) and/or essentially straight-chain and saturated aliphatic tertiary amines containing an aliphatic radical having 10 to 20 carbon atoms which are substituted by ω-hydroxy-($C_1$–$C_4$)-alkyl groups, N,N-bis(2- hydroxyethyl) alkylamines having 10 to 20 carbon atoms, preferably 12 to 18 carbon atoms, in the alkyl radical being particularly suitable. The effective amount of antistatic is in the range from about 0.05 to 3% by weight. A further preferred antistatic is glycerol monostearate.

The present invention furthermore relates to a process for the production of the multilayer film according to the invention by the coextrusion process known per se. This process involves coextruding the melts corresponding to the individual layers of the film through a flat-film die, taking off the resultant film on one or more rolls for solidification, subsequently biaxially stretching (orienting) the film, heat-setting the biaxially stretched film and, if desired, corona-treating or flame-treating the film on the surface of the layer intended for corona treatment.

The biaxial stretching (orientation) can be carried out simultaneously or consecutively, preference being given to consecutive biaxial stretching in which stretching is carried out first longitudinally (in the machine direction) and then transversely (perpendicular to the machine direction).

As is conventional in the coextrusion process, the polymer or polymer mixture of the individual layers is first compressed and liquefied in an extruder, it being possible for any additives to be already contained in the polymer or polymer mixture or added at this time. The melts are then simultaneously forced through a flat-film die (slot die), and the extruded multilayer film is taken off on one or more take-off rolls, during which it cools and solidifies.

The resultant film is then stretched longitudinally and transversely to the extrusion direction, which results in an orientation of the molecule chains. The stretching ratio in the longitudinal direction is preferably from about 4:1 to 7:1 and in the transverse direction stretching ratio is preferably from about 8:1 to 10:1 The longitudinal stretching is expediently carried out with the aid of two rolls running at different speeds corresponding to the desired stretching ratio, and the transverse stretching is carried out with the aid of an appropriate tenter frame.

The biaxial stretching of the film is followed by heat setting (heat treatment) thereof, during which the film is kept at a temperature of from about 140 to 160°, for about 0.5 to 10 sec. The film is subsequently wound up in a conventional manner using a wind-up unit.

It has proven particularly favorable to keep the take-off roll or rolls, which also cool and solidify the extruded film, at a temperature of about 50 to 110° C.

The temperatures at which the longitudinal and transverse stretching are carried out may vary. In general, the longitudinal stretching is preferably carried out at a temperature of about 120 to 150° C., and the transverse stretching at a temperature of about 155 to 190° C.

If desired, as mentioned above, the biaxial stretching can be followed by corona or flame treatment of one or both surfaces of the film by conventional methods. Only outer layers which are free of silicone oil are corona or flame treated. The corona or flame treatment of a heat-sealable outer layer containing silicone oil destroys or impairs its heat-sealability.

Corona treatment involves passing the film between two conductor elements serving as electrodes with such a high voltage, usually an alternating voltage (from about 10 to 20 kV and about 20 to 40 kHz), being applied between the electrodes that spray or corona discharge can occur. The spray or corona discharge causes the air above the film surface to ionize and react with the molecules of the film surface, forming polar inclusions in the essentially nonpolar polymer matrix.

For flame treatment with a polarized flame (see U.S. Pat. No. 4,622,237), a direct electrical voltage is applied between a burner (negative pole) and a chill roll. The level of the applied voltage is from about 500 to 3,000 V, preferably in the range from about 1,500 to 2,000 V. The applied voltage increases the acceleration of the ionized atoms, which hit the polymer surface with greater kinetic energy. The chemical bonds within the polymer molecule become easier to break, and the formation of free radicals proceeds more rapidly. The thermal load on the polymer during this procedure is substantially less than in the case of standard flame treatment, and films can be obtained in which the heat-sealing properties of the treated side are even better than those of the untreated side.

It has been found that films containing outer layers which have been treated with the antiblocking agent combination according to the invention have been significantly improved with respect to their running properties, elevated temperature blocking properties and heat-sealing properties. Surprisingly, significantly improved seal seam strengths are also achieved. In particular, it is possible to significantly improve the results of rapid sealing. Rapid sealing is carried out using a shortened sealing time and a reduced pressure. Surprisingly, seal seam strengths which are entirely comparable with the strengths achieved under conventional conditions (130° C., sealing time 0.5 s, sealing pressure 10 N/mm$^2$) are obtained under these new conditions. This enables the speed of packaging machines to be increased. In general, the seal seam strengths (measured at about 140° C., 0.35 N/cm$^2$ and 0.15 s) are greater than about 1.2 N/15 mm, preferably in the range from about 1.5 to 2.5 N/15 mm. Surprisingly, the films according to the invention additionally have excellent blocking values (properties) at elevated temperatures. The blocking behavior at elevated temperatures is an important quality feature of film packaging, since cigarette packs which block tend to stick to one another at elevated temperatures, as can occur in automatic cigarette machines, and can no longer be removed from the machine. In general, the elevated temperature blocking values of the films according to the present invention are in the range of about 0.5 to 6 N, preferably in the range of about 1 to 2.5 N.

It has furthermore been found that films containing the antiblocking agent combination according to the present invention in the outer layer(s) and simultaneously having a minimum heat-sealing temperature of about 105 to 115° C. have particular advantages as packaging films on high-speed packaging machines. The reduction in the minimum heat-sealing temperature enables among other things a further increase in the speed, since a significantly shorter sealing time is required for the same temperature as in the case of films of the prior art. It is also possible to reduce the temperature in the sealing zone, which provides considerable savings in energy. It has been found that a reduction in the minimum heat-sealing temperature to a range from about 105 to 115° C., particularly in the case of rapid sealing, gives good seal seam strengths, only if the outer layer contains the coarse (first) and fine (second) antiblocking agent combination according to the present invention.

The sliding friction of the film has been optimized for good wrapping and is generally in the range from about 0.2 to 0.35. Films which are too smooth result in loose wrapping, and films which are too matt (unsmooth) tend to block and result in wrinkling. A coefficient of sliding friction in the ideal range of about 0.2 to 0.35 ensures fault-free running.

The embodiment of the film according to the present invention having a selected minimum heat-sealing temperature from about 105 to 115° C. thus represents a film which has been very particularly improved compared with the prior art and is, in particular, highly suitable as a cigarette wrapping film.

In summary, it should be stated that the film according to the present invention offers a particularly advantageous selection of improved properties, in particular it offers, excellent seal seam strength, particularly in the case of rapid sealing very good blocking values at elevated temperature excellent running on high-speed machines optimized sliding friction values tight cigarette wrapping.

The invention is now illustrated in greater detail with reference to working examples.

EXAMPLE 1

A three-layer film having an overall thickness of 20 μm and an ABA layer structure, i.e., the base layer B was surrounded by two identical outer layers A, was produced by coextrusion and subsequent step-wise orientation in the longitudinal and transverse directions. Each of the outer layers had a thickness of 0.6 μm.

All layers contained 0.13% by weight of pentaerythritol tetrakis[4-(3,5-di-tert-butyl-4-hydroyphenyl)propionate] (Irganox® 1010) as a stabilizer and 0.06% by weight of calcium stearate as a neutralizer.

The base layer B essentially comprised a polypropylene homopolymer having an n-heptane-soluble content of 4% by weight and a malting point of 160 to 162° C. The melt flow index of the polypropylene homopolymer was 3.2 g/10 min at 230° C. and a load of 21.6 N (DIN 53 735).

The polyolefin outer layers essentially comprised a mixture of 50% by weight of a random ethylene-propylene copolymer having a content of 4% by weight of ethylene, and 50% by weight of ethylene-propylene-1-butene terpolymer having a content of 3% by weight of ethylene and 8% by weight of 1-butene, so that the outer layer mixture had an ethylene content of 3.5% by weight, a propylene content of 92.5% by weight and a 1-butene content of 4% by weight.

The polyolefin outer layers each contained 0.9% by weight of a polydimethylsiloxane silicone oil having a viscosity of 30,000 mm$^2$/s, 0.17% by weight of an organically aftertreated coated silicone dioxide having a mean particle diameter of 4 μm and 0.17 % by weight of a non-organically aftertreated silicon dioxide having a mean particle diameter of 2 μm.

EXAMPLE 2

Example 1 was repeated, but the film did not have an ABA structure, but instead an ABC structure, i.e., the base layer B was surrounded by different outer layers A and C. Outer layer A was identical to the outer layers A from Example 1e but contained no polydimethylsiloxane silicone oil. Outer layer C was identical to the outer layers A from Example 1, but contained 1.8% by weight of polydimethylsiloxane, having a viscosity of 30.000 mm$^2$/s.

EXAMPLE 3

Example 1 was repeated. The film had an ABA structure as in Example 1. The polyolefin outer layers essentially comprised a mixture of 30% by weight of a random ethylene-propylene copolymer having a content of 4% by weight of ethylene, and 70% by weight of ethylene-propylene-1-butene terpolymer having a content of 3% by weight of ethylene and a content of 8% by weight of 1-butene, so that the outer layer mixture had an ethylene content of 3.3% by weight, a propylene content of 91.1% by weight and a 1-butene content of 5.6% by weight.

EXAMPLE 4

Example 3 was repeated. The polyolefin outer layers contained 1.0% by weight of a polydimethylsiloxane silicone oil having a viscosity of 30,000 mm$^2$/s, 0.20% by weight of an organically aftertreated coated silicon dioxide having a mean particle diameter of 4 μm and 0.14% by weight of a non-organically aftertreated silicon dioxide having a mean particle diameter of 2 μm.

EXAMPLE 5

Example 1 was repeated. The polyolefin outer layers essentially comprised a mixture of 40% by weight of a random ethylene-propylene copolymer having a content of 4% by weight of ethylene, and 60% by weight of an ethylene-propylene-1-butene terpolymer having a content of 4% by weight of ethylene and 6% by weight of 1-butene, so that the outer layer mixture had an ethylene content of 4% by weight, a propylene content of 92.4% by weight and a 1-butene content of 3.6% by weight.

COMPARATIVE EXAMPLE 1

Example 1 was repeated. The polyolefin outer layers each contained 0.9% by weight of a polydimethylsiloxane silicone oil having a viscosity of 30,000 mm$^2$/s and 0.17% by weight of a non-organic aftertreated silicon dioxide having a mean particle diameter of 2 μm.

COMPARATIVE EXAMPLE 2

Comparative Example 1 was repeated. The polyolefin outer layers each contained 0.9% by weight of a polydimethylsiloxane silicone oil having a viscosity of 30,000 mm$^2$/s and 0.34% by weight of silicon dioxide which was not subject to organic aftertreatment coating and has a mean particle diameter of 2 μm.

COMPARATIVE EXAMPLE 3

Example 1 was repeated. The polyolefin outer layers each contained 0.9% by weight of a polydimethylsiloxane silicone oil having a viscosity of 30,000 mm$^2$/s and 0.34% by weight of organically aftertreated coated silicon dioxide having a mean particle diameter of 4 μm.

The properties of the films of the examples and comparative examples are shown in the table below.

The raw materials and films were characterized using the following measurement methods:

Melt Flow Index

The melt flow index was measured in accordance with DIN 53 735 at a load of 21.6 N and 230° C. or at a load of 50 N and 190° C.

Melting Point

DSC measurement, maximum of the melting curve, heating rate 20° C./min.

Haze

The haze of the film was measured in accordance with ASTH-D 1003-52.

Gloss

The gloss was determined in accordance with DIN 67 530. The reflection value was measured as an optical characteristic of the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be given together with the angle of incidence.

Seal Seam Strength After Rapid Sealing

For the determination, two film strips 15 mm in width were laid one on top of the other and sealed at 140° C. for 0.15 sec at a pressure of 0.35 N/cm$^2$ (instrument used: Brugger type NDS with sealing jaws heated on one side). The seal seam strength was determined by the T-peel method.

Friction

The coefficient of sliding friction was determined in accordance with DIN 53 375.

Blocking Values at Elevated Temperature

The elevated-temperature blocking test involves measurement of the push-off forces in Newtons (N) necessary to move or separate two film-wrapped packs which have been exposed to a temperature of 70° C. and a weight of 200 g for 2 hours.

Surface Tension

The surface tension was determined by the ink method (DIN 53 364).

Printability

The corona-treated films were printed 14 days after production (short-term assessment) and 6 months after production (long-term assessment). The ink adhesion was assessed by the adhesion-tape test. If the adhesive tape was able to remove a little ink, the ink adhesion was assessed as being moderate and if a significant amount of ink was removed it was assessed as being poor.

Determination of the Minimum Heat-sealing Temperature

Heat-sealed samples (seal seam 20 mm×100 mm) are produced using the Brugger HSG/ET sealing unit by sealing a film at different temperatures with the aid of two heated sealing jaws at a pressure of 10 N/cm$^2$ for 0.5 sec. Test strips with a width of 15 mm are cut out of the sealed samples. The T-peel seam strength, i.e., the force necessary to separate the test strips, is determined using a tensile testing machine at a peel rate of 200 mm/min, during which the seal seam plane forms a right angle with the direction of tension. The minimum heat-sealing temperature is the temperature at which a seal seam strength of at least 0.5 N/15 mm is achieved.

TABLE

| | Minimum heat-sealing temperature (10 N/cm$^2$, 0.5 s) [° C.] | | Seal seam strength = HSE (140° C.; 0.35 N/cm$^2$; 0.15 s) [N/15 mm] | | Blocking values at elevated temperature [N] | | Coefficient of sliding friction | | Passage through a cigarette wrapping machine (Type GD X2) |
|---|---|---|---|---|---|---|---|---|---|
| | Side 1 | Side 2 | Side 1/1 | Side 2/2 | Side 1/1 | Side 2/2 | Side 1/1 | Side 2/2 | running at 400 packs/min |
| E1 | 109 | 109 | 2.1 | 2.1 | 1.1 | 1.2 | 0.28 | 0.29 | ++ |
| E2 | 109 | 110 | 2.1 | 2.0 | 1.2 | 1.3 | 0.27 | 0.26 | ++ |
| E3 | 107 | 108 | 2.3 | 2.2 | 1.6 | 1.8 | 0.30 | 0.31 | ++ |
| E4 | 107 | 107 | 2.0 | 2.0 | 1.4 | 1.4 | 0.29 | 0.28 | ++ |
| E5 | 110 | 110 | 2.1 | 2.0 | 1.6 | 1.8 | 0.30 | 0.30 | ++ |
| CE1 | 108 | 109 | 2.2 | 2.3 | >10 | >10 | 0.42* | 0.44* | Film partly sticks and blocks; earing. |
| CE2 | 109 | 109 | 2.1 | 2.0 | 9 | 10 | 0.38* | 0.40* | same as for CE1, but not so pronounced. |
| CE3 | 113 | 114 | 0.9 | 0.8 | 2.3 | 2.5 | 0.32 | 0.33 | Seal seams partly leaky. |

*Film blocked
E = Example;
CE = Comparative Example

What is claimed is:

1. An oriented heat-sealable multilayer polyolefin film, comprising a base layer containing polypropylene and a heat-sealable outer layer on each side of the base layer, wherein the heat-sealable outer layers independently have a thickness of 0.4 to 2 μm, said outer layers having the same composition, wherein said composition comprises a mixture of (i) at least one polymer selected from the group consisting of a polypropylene copolymer, a polypropylene terpolymer, and blends thereof, (ii) a mixture of a first antiblocking agent having a mean particle diameter from about 3 to 5 μm and a second antiblocking agent having a mean particle diameter from about 1 to 2.5 μm, and (iii) silicone oil.

2. A multilayer polyolefin film as claimed in claim 1, wherein the first antiblocking agent has an organic coating.

3. A multilayer polyolefin film as claimed in claim 2, wherein said organic coating on the first antiblocking agent contains carboxylic acid.

4. A multilayer polyolefin film as claimed in claim 2, wherein the organic coating is selected from the group consisting of stearic acid, tartronic acid, malic acid, tartaric acid, and citric acid.

5. A multilayer polyolefin film as claimed in claim 1, wherein the first and second antiblocking agents are $SiO_2$.

6. A multilayer polyolefin film as claimed in claim 1, wherein the first antiblocking agent is present in an amount of about 0.05 to 0.4% by weight, based on the outer layer, and the second antiblocking agent is present in an amount of about 0.05 to 0.4% by weight, based on the outer layer.

7. A multilayer polyolefin film as claimed in claim 1, wherein the heat-sealable outer layers have a minimum heat-sealing temperature in the range of about 105 to 115° C., and the seal seam strength of the film measured at the conditions of about 140° C., 0.35 N/cm$^2$, and 0.15 s, is greater than about 1.2 M/15 mm.

8. A multilayer polyolefin film as claimed in claim 1, wherein the polypropylene copolymer is an ethylene-propylene copolymer, and the polypropylene terpolymer is an ethylene-propylene-butylene terpolymer.

9. A multilayer polyolefin film as claimed in claim 8, wherein the heat-sealable outer layers comprises a mixture of the ethylene-propylene copolymer and the ethylene-propylene-butylene terpolymere and wherein the mixture has an ethylene content of about 2 to 5% by weight, a butylene content of about 2 to 8% by weight and a propylene content of about 85 to 96% by weights based on the total weight of the mixture.

10. A multilayer polyolefin film as claimed in claim 1, wherein the polypropylene copolymer is an ethylene-propylene copolymer and has an ethylene content of about 3 to 7% by weight, and the polypropylene terpolymer is a $C_2/C_3/C_4$-terpolymer and has a $C_2$ content of about 2 to 5% by weight, a $C_3$ content of about 85 to 93% by weight and a $C_4$ content of about 5 to 10% by weight, based on the total weight of the particular copolymer or terpolymer.

11. A multilayer polyolefin film as claimed in claim 1, wherein the outer layers comprise a mixture of a polypropylene copolymer which is a $C_2/C_3$-copolymer and a polypropylene terpolymer which is a $C_2/C_3/C_4$-terpolymer and the mixture has a content of the $C_2/C_3$ copolymer in the range from about 20 to 80% by weight, and a content of the $C_2/C_3/C_4$-terpolymer in the range from about 80 to 20% by weight, based on the total weight of the mixture.

12. A multilayer polyolefin film as claimed in claim 11, wherein the mixture has a $C_2/C_3$ copolymer content in the range of about 30 to 60% by weight, and a $C_2/C_3/C_4$-terpolymer content in the range of about 40 to 70% by weight.

13. A multilayer polyolefin film as claimed in claim 1, wherein the heat-sealable outer layers contain said silicone oil in an amount of about 0.5 to 3.0% by weight.

14. A multilayer polyolefin film as claimed in claim 13, wherein the silicone oil is a polydimethylsiloxane which has a viscosity in the range of about 20,000 to 3,000,000 mm$^2$/s.

15. A packaged article comprising the multilayer polyolefin film as claimed in claim 1, wherein said film at least partially surrounds an article.

16. A multi-layer polyolefin film as claimed in claim 1, wherein the first antiblocking agent is selected from the group consisting of $SiO_2$, silicates, diatomaceous earth, chalk, $TiO_2$ and mixtures thereof.

17. A multi-layer polyolefin film as claimed in claim 16, wherein the first antiblocking agent is $SiO_2$.

18. A multi-layer polyolefin film as claimed in claim 1, wherein only the first antiblocking agent has an organic coating.

19. A multilayer polyolefin film as claimed in claim 18, wherein the organic coating is selected from the group consisting of stearic acid, tartronic acid, malic acid, tartaric acid, and citric acid.

* * * * *